US012434599B2

(12) United States Patent
Matsumoto

(10) Patent No.: US 12,434,599 B2
(45) Date of Patent: Oct. 7, 2025

(54) AIRCRAFT HAVING COOLING CIRCUITS INDEPENDENT OF EACH OTHER

(71) Applicant: Honda Motor Co., Ltd., Tokyo (JP)

(72) Inventor: Tomoyo Matsumoto, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 753 days.

(21) Appl. No.: 17/694,713

(22) Filed: Mar. 15, 2022

(65) Prior Publication Data

US 2022/0306300 A1 Sep. 29, 2022

(30) Foreign Application Priority Data

Mar. 29, 2021 (JP) ................. 2021-055983

(51) Int. Cl.
*B60L 58/26* (2019.01)
*B64D 13/00* (2006.01)
*B64D 27/31* (2024.01)
*B64D 27/34* (2024.01)
*B64D 27/357* (2024.01)
*B64D 31/16* (2024.01)

(52) U.S. Cl.
CPC ............ *B60L 58/26* (2019.02); *B64D 13/006* (2013.01); *B64D 27/31* (2024.01); *B64D 27/34* (2024.01); *B64D 27/357* (2024.01); *B64D 31/16* (2024.01); *B60L 2200/10* (2013.01)

(58) Field of Classification Search
CPC . B60L 58/26; B64D 31/16; F02C 7/18; F02C 6/14
See application file for complete search history.

(56) References Cited

U.S. PATENT DOCUMENTS

2004/0159119 A1* 8/2004 Hu .................. B64D 13/00
62/99
2013/0140001 A1* 6/2013 Mandl ................ B60H 1/143
165/96
(Continued)

FOREIGN PATENT DOCUMENTS

CN 111076845 4/2020
JP H0765870 3/1995
(Continued)

OTHER PUBLICATIONS

"Office Action of Japan Counterpart Application", issued on Jun. 4, 2024, with English translation thereof, p. 1-p. 8.

*Primary Examiner* — Gerald L Sung
*Assistant Examiner* — Jacek Lisowski
(74) *Attorney, Agent, or Firm* — JCIPRNET

(57) ABSTRACT

In an aircraft, a cooling target having a different amount of heat depending on a situation is sufficiently cooled. An aircraft is provided with a cooling facility having a first cooling circuit and a second cooling circuit that are independent of each other. The first cooling circuit includes a first circulation flow path that allows a first cooling medium to sequentially and repeatedly pass through a cooling target. Similarly, the second cooling circuit includes a second circulation flow path that allows a second cooling medium to sequentially and repeatedly pass through the cooling target. Here, the first circulation flow path and the second circulation flow path do not communicate with each other. Therefore, the first cooling medium and the second cooling medium do not merge or split.

25 Claims, 11 Drawing Sheets

(56) References Cited

U.S. PATENT DOCUMENTS

| | | | |
|---|---|---|---|
| 2014/0165606 A1* | 6/2014 | Oh | F25B 21/02 |
| | | | 62/3.3 |
| 2014/0373533 A1* | 12/2014 | Jensen | F01K 27/02 |
| | | | 903/915 |
| 2015/0325889 A1 | 11/2015 | Jung et al. | |
| 2018/0362179 A1 | 12/2018 | Finger et al. | |
| 2019/0263252 A1* | 8/2019 | Hettrich | B60L 1/003 |
| 2020/0198497 A1* | 6/2020 | Honjo | H01M 10/625 |
| 2020/0220236 A1* | 7/2020 | Durrani | H01M 10/667 |
| 2020/0231060 A1* | 7/2020 | Matsuyama | B60L 53/62 |
| 2020/0303791 A1* | 9/2020 | Choi | H01M 10/625 |
| 2020/0331360 A1* | 10/2020 | Soh | H01M 10/6551 |
| 2020/0339010 A1 | 10/2020 | Villanueva et al. | |

FOREIGN PATENT DOCUMENTS

| | | |
|---|---|---|
| JP | 2014229480 | 12/2014 |
| JP | 2019023059 | 2/2019 |
| JP | 2019029329 | 2/2019 |
| JP | 2020053287 | 4/2020 |

\* cited by examiner

| Example | Pump | When normal | | | When failed |
|---|---|---|---|---|---|
| | | TR1<Ta | Ta≤TR1<Tb | Tb≤TR1<Tc | TR1≥Tc |
| First example | First pump | Lo | Hi | Hi | Hi |
| | Second pump | Stop | Stop | Lo | Hi |
| Second example | First pump | Lo | Hi | Lo | Hi |
| | Second pump | Stop | Stop | Lo | Hi |
| Third example | First pump | Lo | Lo | Hi | Hi |
| | Second pump | Stop | Lo | Lo | Hi |

FIG. 6

| Example | Pump | When normal | | | | When failed |
|---|---|---|---|---|---|---|
| | | TR2<To | To≦TR2<Tα | Tα≦TR2<Tβ | Tβ≦TR2<Tγ | TR2≧Tγ |
| First example | Third pump | Stop | Lo | Hi | Hi | Hi |
| | Fourth pump | Stop | Stop | Stop | Lo | Hi |
| Second example | Third pump | Stop | Lo | Hi | Lo | Hi |
| | Fourth pump | Stop | Stop | Stop | Lo | Hi |
| Third example | Third pump | Stop | Lo | Lo | Hi | Hi |
| | Fourth pump | Stop | Stop | Lo | Lo | Hi |

FIG. 8

AIRCRAFT HAVING COOLING CIRCUITS INDEPENDENT OF EACH OTHER

CROSS-REFERENCE TO RELATED APPLICATION

This application claims the priority benefits of Japanese application no. 2021-055983, filed on Mar. 29, 2021. The entirety of the above-mentioned patent application is hereby incorporated by reference herein and made a part of this specification.

BACKGROUND

Technical Field

The disclosure relates to an aircraft provided with a cooling facility for cooling a device (cooling target) that requires cooling.

Description of Related Art

An electric multicopter equipped with a battery pack is known as a kind of aircraft. In this case, the multicopter is provided with a plurality of ducted fans or propellers which are lift generators. Further, the airframe is equipped with a motor for rotating the lift generator, and a battery serving as a power supply that supplies electric power to the motor. In some cases, an additional generator may be installed to supply electric power to the battery pack and the motor. The battery is discharged or charged according to the flight state of the multicopter.

During the flight of the multicopter, it is necessary to continuously supply electric power from the battery to the motor and continuously rotate the lift generator. Therefore, the temperature of the battery is managed to be within an appropriate range. Specifically, a cooling facility that circulates and supplies a cooling medium to the battery is attached. By taking the heat of the battery with the cooling medium, it is possible to prevent the battery from becoming excessively hot.

In the multicopter, electric power needs to be reliably obtained from the battery which is the power supply. Therefore, it is necessary to reliably cool the battery. Thus, it is conceivable that the cooling facility has a redundant configuration. That is, for example, two systems of cooling circuits are provided for the battery. The configurations described in Patent Documents 1 and 2 are known as configurations in which two systems of cooling circuits are provided for the same power supply. The power supply is a battery in Patent Document 1 and a fuel cell in Patent Document 2.

RELATED ART

Patent Documents

[Patent Document 1] Japanese Laid-Open No. 2019-23059
[Patent Document 2] Japanese Laid-Open No. 2020-53287

For example, when the multicopter makes an emergency landing due to an unforeseen situation, a large load is applied to the battery. In this case, the temperature of the battery tends to rise significantly. Accordingly, it is considered necessary to sufficiently cool the battery.

In the configuration described in Patent Document 1, the cooling medium is supplied in only one of two systems of cooling circuits. Accordingly, the supply amount of the cooling medium is limited. Therefore, it is not easy to cope with the situation where a large load is applied to the battery pack (when the temperature of the battery pack is expected to rise significantly).

Furthermore, in the configuration described in Patent Document 2, when the conductivity of the cooling water of one system increases, in order to reduce the ion concentration in the cooling water, the cooling water is merged with the cooling water of the remaining one system, which passes through an ion exchange membrane in advance and has a low ion concentration. That is to say, it is not a configuration for changing the supply amount of the cooling water according to the load of the power feeder.

As described above, although the cooling facility having a redundant configuration is known, a cooling facility capable of appropriately changing the supply amount of the cooling medium to the device that requires cooling, such as a power feeder, has not been proposed.

SUMMARY

According to an embodiment of the disclosure, an aircraft is provided, including a cooling facility for cooling a cooling target. The cooling facility has a first cooling circuit and a second cooling circuit that are independent of each other. The first cooling circuit includes a first circulation flow path that allows a first cooling medium to sequentially and repeatedly pass through the cooling target, a first pressure applying part provided in the first circulation flow path to apply an extrusion pressure to the first cooling medium, and a first cooling heat exchanger provided on a downstream side of the first circulation flow path with respect to the cooling target to take heat from the first cooling medium. The second cooling circuit includes a second circulation flow path that allows a second cooling medium to sequentially and repeatedly pass through the cooling target, a second pressure applying part provided in the second circulation flow path to apply an extrusion pressure to the second cooling medium, and a second cooling heat exchanger provided on a downstream side of the second circulation flow path with respect to the cooling target to take heat from the second cooling medium. The first circulation flow path and the second circulation flow path do not communicate with each other.

BRIEF DESCRIPTION OF THE DRAWINGS

FIG. 6 is a chart showing an operation pattern of the first cooling facility.
FIG. 8 is a chart showing an operation pattern of the second cooling facility.

DESCRIPTION OF THE EMBODIMENTS

Figure 1:
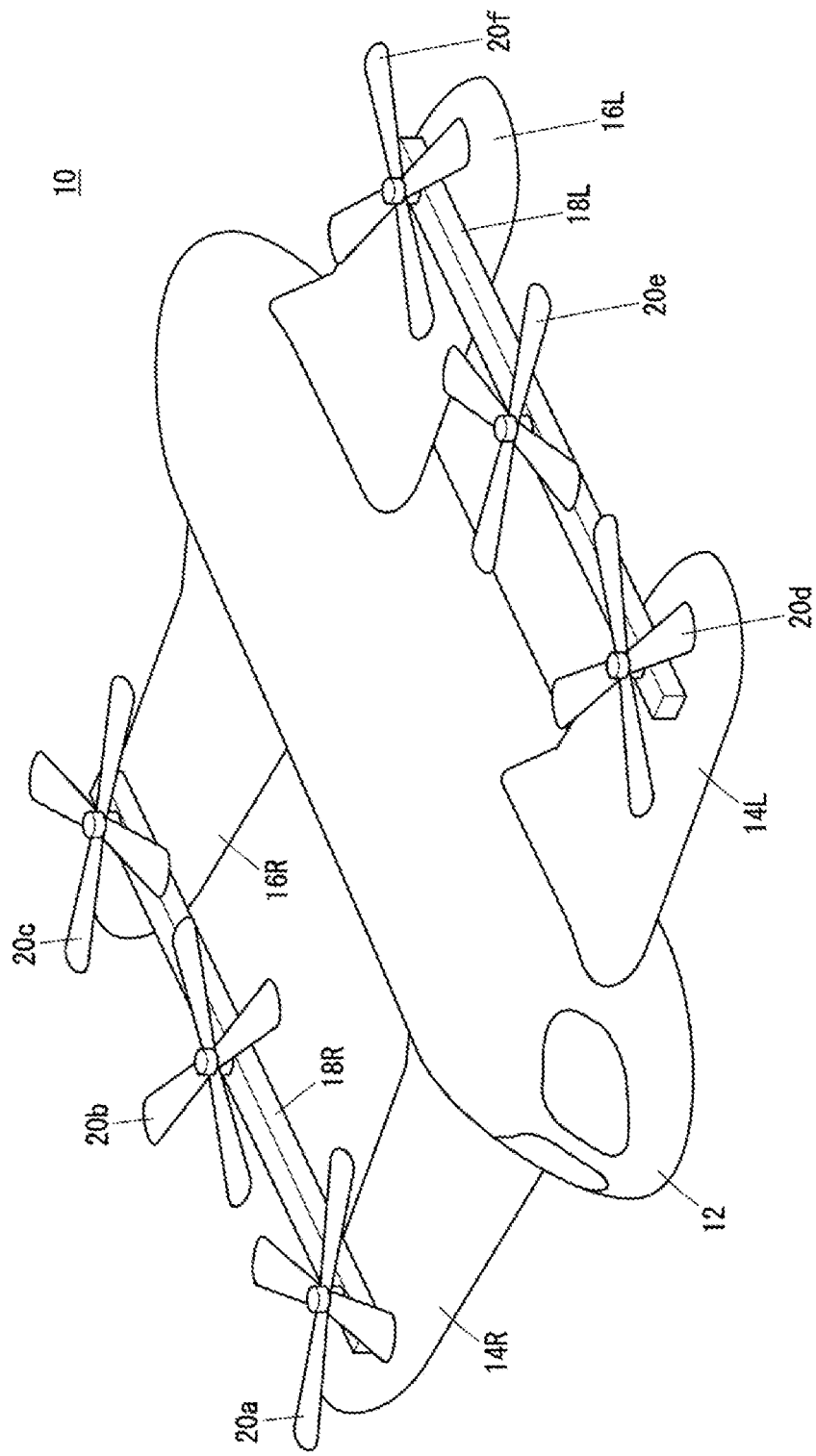
FIG. 1 is a schematic perspective view of a multicopter as an aircraft according to an embodiment of the disclosure.

The disclosure provides an aircraft provided with a cooling facility which is capable of sufficiently cooling a device (cooling target) that requires cooling even if the device has a different amount of heat depending on the situation.

According to an embodiment of the disclosure, an aircraft is provided, including a cooling facility for cooling a cooling target. The cooling facility has a first cooling circuit and a second cooling circuit that are independent of each other. The first cooling circuit includes a first circulation flow path that allows a first cooling medium to sequentially and repeatedly pass through the cooling target, a first pressure applying part provided in the first circulation flow path to apply an extrusion pressure to the first cooling medium, and a first cooling heat exchanger provided on a downstream side of the first circulation flow path with respect to the cooling target to take heat from the first cooling medium. The second cooling circuit includes a second circulation flow path that allows a second cooling medium to sequentially and repeatedly pass through the cooling target, a second pressure applying part provided in the second circulation flow path to apply an extrusion pressure to the second cooling medium, and a second cooling heat exchanger provided on a downstream side of the second circulation flow path with respect to the cooling target to take heat from the second cooling medium. The first circulation flow path and the second circulation flow path do not communicate with each other.

According to the disclosure, the cooling facility provided in the aircraft has the first cooling circuit and the second cooling circuit that are independent of each other. That is, the first circulation flow path included in the first cooling circuit for the first cooling medium to sequentially and repeatedly flow through, and the second circulation flow path included in the second cooling circuit for the second cooling medium to sequentially and repeatedly flow through do not communicate with each other. Therefore, the first cooling medium and the second cooling medium do not merge or split.

Then, when the amount of heat of the cooling target is low (when the temperature is low), for example, the cooling target can be cooled by the first cooling circuit while the cooling performed by the second cooling circuit is stopped. Furthermore, when the amount of heat of the cooling target is high (when the temperature is high), for example, cooling may be performed by both the first cooling circuit and the second cooling circuit. By configuring the first cooling circuit and the second cooling circuit independently of each other in this way, it is possible to change the degree of cooling according to the amount of heat generated by the cooling target.

In addition, since the first circulation flow path and the second circulation flow path do not communicate with each other, it is not required to provide a merging point or a branching point. Therefore, the first circulation flow path and the second circulation flow path are simplified and the weight of the cooling facility is reduced. Accordingly, the flexibility in the layout of the cooling facility in the aircraft is improved, and the weight of the aircraft can be reduced.

Suitable embodiments of an aircraft according to the disclosure are provided hereinafter and will be described in detail with reference to the accompanying drawings. In the following, "upstream" and "downstream" represent an upstream side in a flow direction and a downstream side in the flow direction of a first cooling medium to a fourth cooling medium.

Further, in order to facilitate understanding, the following description illustrates a case where a first cooling circuit 42$a$ (and a third cooling circuit 42$c$) is set to a flow state with priority, but a second cooling circuit 42$b$ (and a fourth cooling circuit 42$d$) may be set to the flow state with priority instead. In the latter case, the second cooling circuit 42$b$ (and the fourth cooling circuit 42$d$) corresponds to the "first cooling circuit" in the claims. Then, the first cooling circuit 42$a$ (and the third cooling circuit 42$c$) corresponds to the "second cooling circuit" in the claims.

FIG. 1 is a schematic perspective view of a multicopter 10 as an aircraft according to the present embodiment. The multicopter 10 includes an airframe 12, a right main wing 14R and a left main wing 14L that project from the front side of the airframe 12 and extend in the width direction, and a right horizontal stabilizer 16R and a left horizontal stabilizer 16L that project from the rear side of the airframe 12 and extend in the width direction. Further, a right support bar 18R is bridged from the right main wing 14R to the right horizontal stabilizer 16R, and a left support bar 18L is bridged from the left main wing 14L to the left horizontal stabilizer 16L.

Propellers 20$a$ to 20$c$ are provided on the right main wing 14R, the right support bar 18R, and the right horizontal stabilizer 16R, respectively. Propellers 20$d$ to 20$f$ are provided on the left main wing 14L, the left support bar 18L, and the left horizontal stabilizer 16L, respectively. The six propellers 20$a$ to 20$f$ are lift generators. That is, the multicopter 10 can take off or fly in the air under the action of the six propellers 20$a$ to 20$f$.

Figure 2:
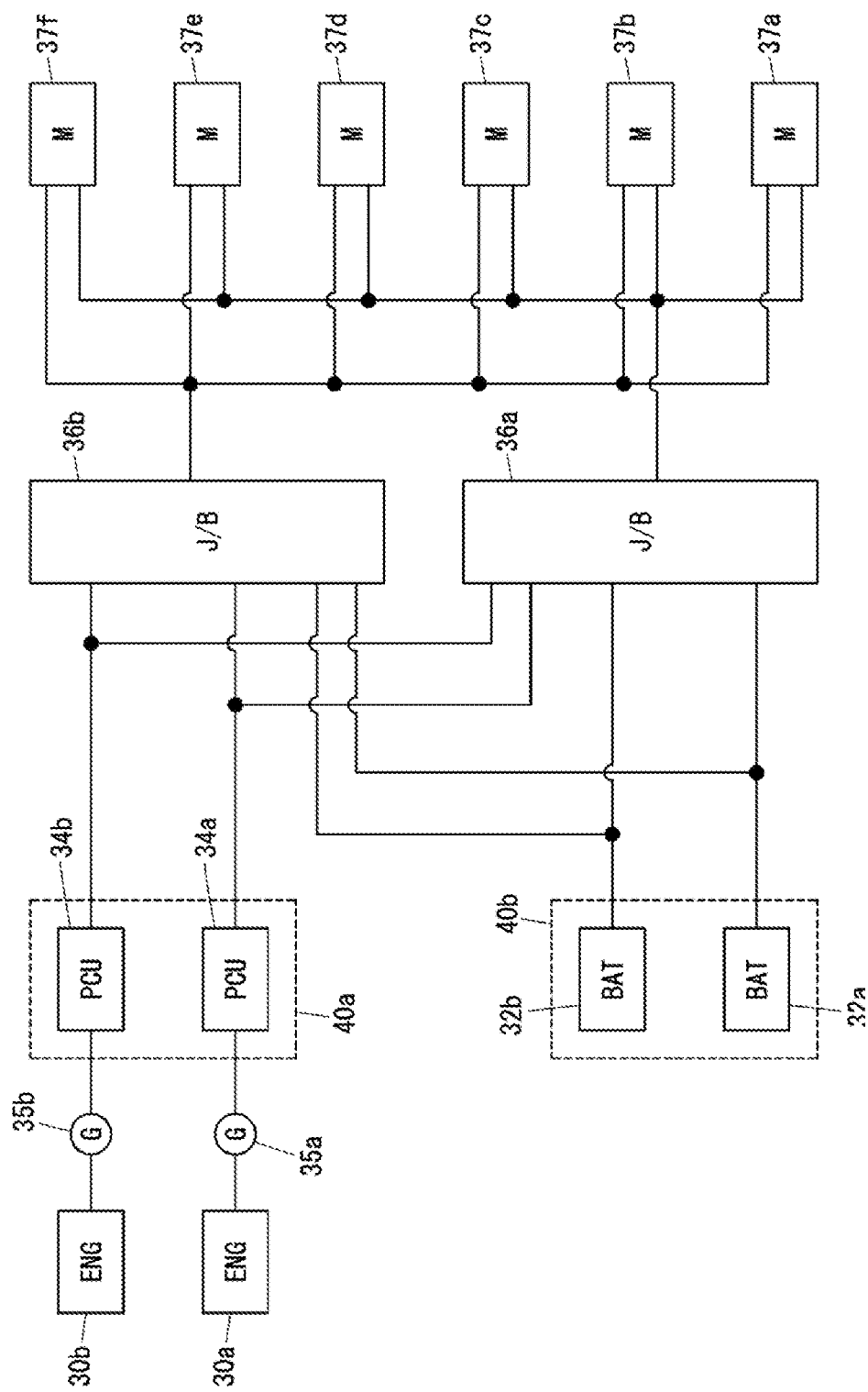
FIG. 2 is a drive system diagram schematically showing a drive circuit of the multicopter.

In the present embodiment, the multicopter 10 is a so-called hybrid type multicopter. That is, as shown in FIG. 2, the airframe 12 is equipped with a first engine 30$a$, a second engine 30$b$, a first battery 32$a$, and a second battery 32$b$ for driving the propellers 20$a$ to 20$f$. The first engine 30$a$ is controlled by a first power control unit (PCU) 34$a$, and the second engine 30$b$ is controlled by a second PCU 34$b$. Both the first PCU 34$a$ and the second PCU 34$b$ function as inverters. First and second generators 35$a$ and 35$b$ are provided between the first engine 30$a$ and the first PCU 34$a$, and between the second engine 30$b$ and the second PCU 34$b$, respectively.

The first PCU 34$a$, the second PCU 34$b$, the first battery 32$a$, and the second battery 32$b$ are all electrically connected to both a first junction box 36$a$ and a second junction box 36$b$. Further, both the first junction box 36$a$ and the second junction box 36$b$ are electrically connected to motors 37$a$ to 37$f$ that are for driving the propellers 20$a$ to 20$f$. As the motors 37$a$ to 37$f$ are energized, the rotor blades of the propellers 20$a$ to 20$f$ rotate. As a result, the multicopter 10 can take off or fly in the air.

The first generator 35$a$ and the second generator 35$b$ (both are rotary electric machines) for supplying electric power to the first battery 32$a$ and the second battery 32$b$ are electrically connected to the first battery 32$a$ and the second battery 32$b$ via the first junction box 36$a$ and the second junction box 36$b$. When the multicopter 10 is in a steady operation and the loads on the first battery 32$a$ and the second battery 32b are low, electric power is supplied to the first battery 32a and the second battery 32b via the first junction box 36a and the second junction box 36b. That is, the first battery 32a and the second battery 32b are charged.

Figure 3:
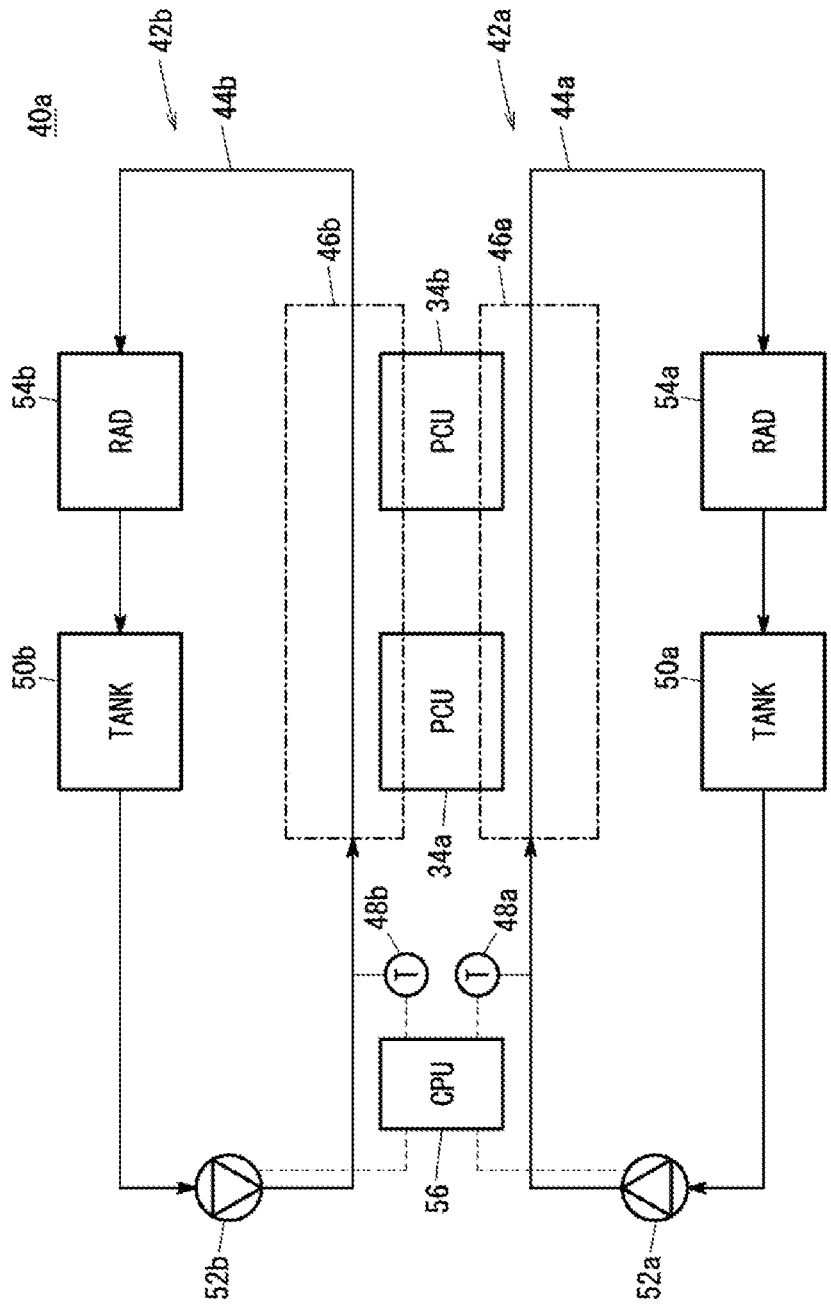
FIG. 3 is a first cooling system diagram schematically showing a first cooling facility.
Figure 4:
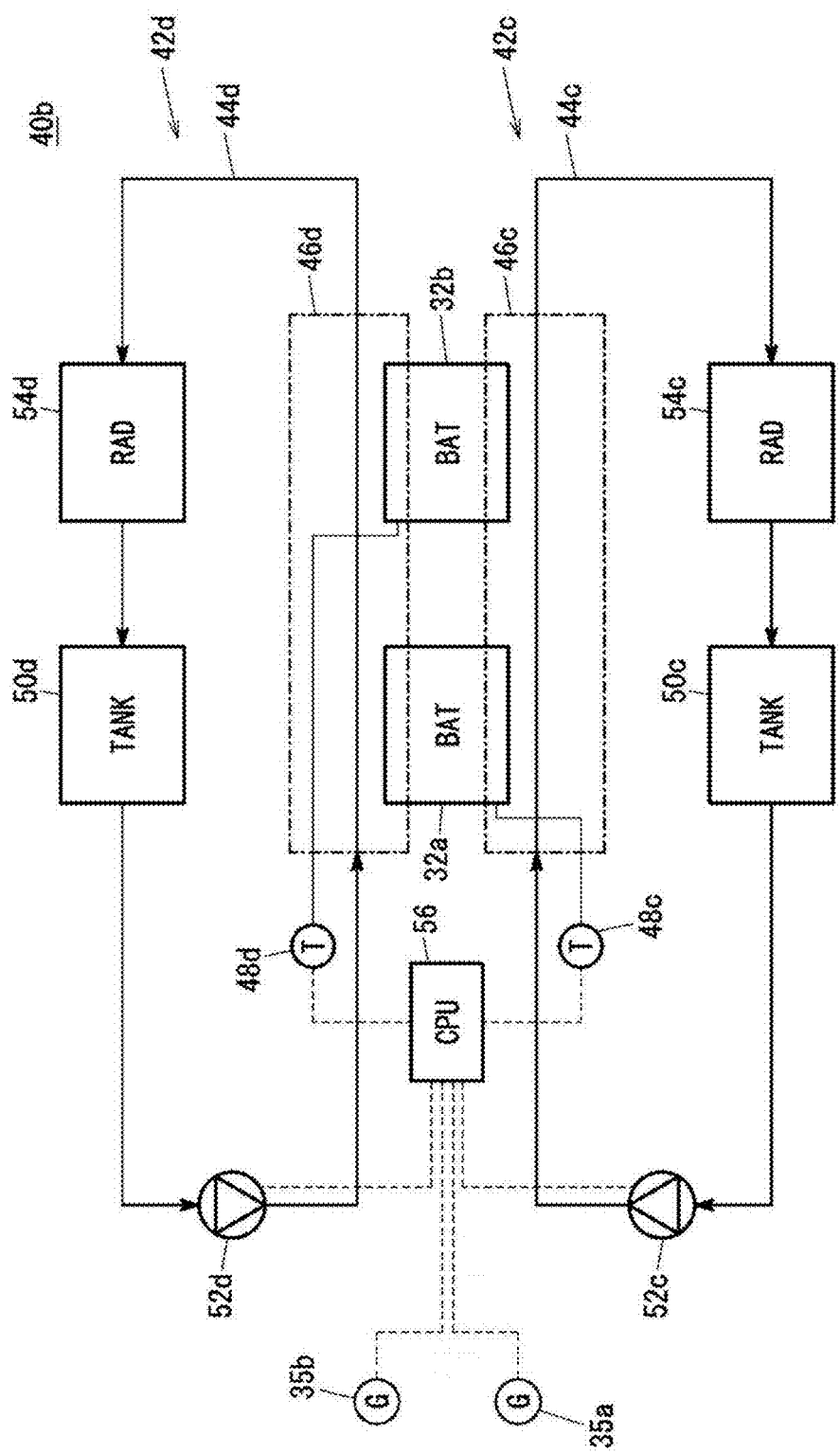
FIG. 4 is a second cooling system diagram schematically showing a second cooling facility.

The multicopter 10 is provided with a first cooling facility 40a shown in FIG. 3 and a second cooling facility 40b shown in FIG. 4. The first cooling facility 40a is for cooling the first PCU 34a and the second PCU 34b, and the second cooling facility 40b is for cooling the first battery 32a and the second battery 32b. That is, in the present embodiment, the first PCU 34a, the second PCU 34b, the first battery 32a, and the second battery 32b are the devices (cooling target) that require cooling. Nevertheless, a generator, a DC-DC converter, a current converter such as a DC-AC inverter, and the like can also be the cooling target.

Hereinafter, the first cooling facility 40a and the second cooling facility 40b will be described. As shown in FIG. 3, the first cooling facility 40a includes the first cooling circuit 42a and the second cooling circuit 42b. That is, the first cooling facility 40a has two systems of cooling paths. First, the first cooling circuit 42a has a first circulation flow path 44a for circulating and supplying the first cooling medium to the first PCU 34a and the second PCU 34b. In the first circulation flow path 44a, the first PCU 34a is arranged on the upstream side and the second PCU 34b is arranged on the downstream side. In other words, the first cooling medium flows in the order of the first PCU 34a and the second PCU 34b.

In the middle of the first circulation flow path 44a, a first cooling jacket 46a is provided at a portion passing in the vicinity of the first PCU 34a and the second PCU 34b. That is, the first cooling jacket 46a constitutes a part of the first circulation flow path 44a. Further, a first temperature sensor 48a is provided slightly upstream of the first cooling jacket 46a. The first temperature sensor 48a detects the temperature of the first cooling medium flowing slightly upstream of the first cooling jacket 46a in the first circulation flow path 44a.

In the first circulation flow path 44a, a first storage container 50a for storing the first cooling medium and a first pump 52a serving as the first pressure applying part are provided upstream of the first cooling jacket 46a. When the first pump 52a is energized, a discharge pressure (extrusion pressure) is applied from the first pump 52a to the first cooling medium in the first storage container 50a. As a result, the first cooling medium flows in the first circulation flow path 44a.

Further, a first cooling heat exchanger 54a is arranged downstream of the second PCU 34b in the first circulation flow path 44a. When the first cooling medium whose temperature rises by cooling the first PCU 34a and the second PCU 34b passes through the first cooling heat exchanger 54a, the first cooling medium is, for example, cooled by cooling air from a cooling fan (not shown) provided in the vicinity of the first cooling heat exchanger 54a, or air in contact with the first cooling heat exchanger 54a. The cooled first cooling medium is temporarily stored in the first storage container 50a, and then sent out to the first circulation flow path 44a under the action of the first pump 52a. By repeating the above, the first cooling medium circulates and flows in the first circulation flow path 44a.

On the other hand, the second cooling circuit 42b has a second circulation flow path 44b for circulating and supplying the second cooling medium to the first PCU 34a and the second PCU 34b. Also, in the second circulation flow path 44b, the first PCU 34a is located on the upstream side and the second PCU 34b is located on the downstream side. That is, when the second cooling medium flows, the second cooling medium passes through the first PCU 34a and the second PCU 34b in this order.

In the middle of the second circulation flow path 44b, a second cooling jacket 46b is provided at a portion passing in the vicinity of the first PCU 34a and the second PCU 34b. That is, the second cooling jacket 46b constitutes a part of the second circulation flow path 44b. Further, a second temperature sensor 48b is provided slightly upstream of the second cooling jacket 46b. The second temperature sensor 48b detects the temperature of the second cooling medium flowing slightly upstream of the second cooling jacket 46b in the second circulation flow path 44b. In this case, the second cooling jacket 46b faces the first cooling jacket 46a, which facilitates the layout settings of the first PCU 34a and the second PCU 34b for the first cooling jacket 46a and the second cooling jacket 46b.

In the second circulation flow path 44b, a second storage container 50b for storing the second cooling medium and a second pump 52b serving as the second pressure applying part are provided upstream of the second cooling jacket 46b. When the second pump 52b is energized, a discharge pressure (pushing pressure) is applied from the second pump 52b to the second cooling medium in the second storage container 50b. As a result, the second cooling medium flows in the second circulation flow path 44b.

In addition, a second cooling heat exchanger 54b is arranged on the downstream side of the second PCU 34b in the second circulation flow path 44b. When the second cooling medium whose temperature rises by cooling the first PCU 34a and the second PCU 34b passes through the second cooling heat exchanger 54b, the second cooling medium is, for example, cooled by cooling air from a cooling fan (not shown) provided in the vicinity of the second cooling heat exchanger 54b, or air in contact with the second cooling heat exchanger 54b. The cooled second cooling medium is temporarily stored in the second storage container 50b, and then sent out to the second circulation flow path 44b under the action of the second pump 52b. By repeating the above, the second cooling medium can circulate and flow in the second circulation flow path 44b.

As can be seen from FIG. 3, the first circulation flow path 44a and the second circulation flow path 44b do not communicate with each other. Accordingly, the first cooling medium and the second cooling medium do not merge or split. As described above, the first cooling circuit 42a and the second cooling circuit 42b are independent circuits (systems). Therefore, it is possible to set the second cooling circuit 42b to either the flow state or the flow stopped state while the first cooling circuit 42a is in the flow state.

In the above configuration, the first temperature sensor 48a and the second temperature sensor 48b are electrically connected to a central processing unit (CPU) 56, which is the determination part. The temperatures detected by the first temperature sensor 48a and the second temperature sensor 48b are transmitted to the CPU 56 as information signals. The first pump 52a and the second pump 52b are also electrically connected to the CPU 56. The CPU 56 transmits a command signal of energization or stop to the first pump 52a and the second pump 52b.

On the other hand, the second cooling facility 40b includes two systems of cooling paths, the third cooling circuit 42c and the fourth cooling circuit 42d, as shown in FIG. 4. Here, the third cooling circuit 42c is configured in the same manner as the first cooling circuit 42a, and the fourth cooling circuit 42d is configured in the same manner as the second cooling circuit 42b. That is, the third cooling circuit 42c and the fourth cooling circuit 42d correspond to the "first cooling circuit" and the "second cooling circuit" in the claims, respectively. However, in the present specification, in order to clearly distinguish the components of the first cooling facility 40a and the components of the second cooling facility 40b, the same or corresponding components in the first cooling facility 40a and the second cooling facility 40b are assigned with different names and reference numerals.

The third cooling circuit 42c has a third circulation flow path 44c for circulating and supplying the third cooling medium to the first battery 32a and the second battery 32b. In the third circulation flow path 44c, the first battery 32a is located on the upstream side and the second battery 32b is located on the downstream side. That is, the third cooling medium flows in the order of the first battery 32a and the second battery 32b.

In the middle of the third circulation flow path 44c, a third cooling jacket 46c is provided at a portion passing in the vicinity of the first battery 32a and the second battery 32b. That is, the third cooling jacket 46c constitutes a part of the third circulation flow path 44c. Further, the first battery 32a is provided with a third temperature sensor 48c. The third temperature sensor 48c detects the temperature of the first battery 32a to be cooled prior to the second battery 32b.

In the third circulation flow path 44c, a third storage container 50c for storing the third cooling medium and a third pump 52c which is the third pressure applying part are provided upstream of the third cooling jacket 46c. When the third pump 52c is energized, a discharge pressure (extrusion pressure) is applied from the third pump 52c to the third cooling medium in the third storage container 50c. As a result, the third cooling medium flows in the third circulation flow path 44c.

Further, a third cooling heat exchanger 54c is arranged downstream of the second battery 32b in the third circulation flow path 44c. When the third cooling medium whose temperature rises by cooling the first battery 32a and the second battery 32b passes through the third cooling heat exchanger 54c, the third cooling medium is, for example, cooled by cooling air from a cooling fan (not shown) provided in the vicinity of the third cooling heat exchanger 54c, or air in contact with the third cooling heat exchanger 54c. The cooled third cooling medium is temporarily stored in the third storage container 50c, and then sent out to the third circulation flow path 44c under the action of the third pump 52c. By repeating the above, the third cooling medium circulates and flows in the third circulation flow path 44c.

On the other hand, the fourth cooling circuit 42d has a fourth circulation flow path 44d for circulating and supplying the fourth cooling medium to the first battery 32a and the second battery 32b. Also, in the fourth circulation flow path 44d, the first battery 32a is located on the upstream side and the second battery 32b is located on the downstream side. That is, when the fourth cooling medium flows, the fourth cooling medium passes through the first battery 32a and the second battery 32b in this order.

In the middle of the fourth circulation flow path 44d, a fourth cooling jacket 46d is provided at a portion passing in the vicinity of the first battery 32a and the second battery 32b. That is, the fourth cooling jacket 46d constitutes a part of the fourth circulation flow path 44d. Further, the second battery 32b is provided with a fourth temperature sensor 48d. The fourth temperature sensor 48d reliably detects the temperature of the second battery 32b. In this case, the fourth cooling jacket 46d faces the third cooling jacket 46c, which facilitates the layout settings of the first battery 32a and the second battery 32b for the third cooling jacket 46c and the fourth cooling jacket 46d.

In the fourth circulation flow path 44d, a fourth storage container 50d for storing the fourth cooling medium and a fourth pump 52d serving as the fourth pressure applying part are provided upstream of the fourth cooling jacket 46d. When the fourth pump 52d is energized, a discharge pressure (extrusion pressure) is applied from the fourth pump 52d to the fourth cooling medium in the fourth storage container 50d. As a result, the fourth cooling medium flows in the fourth circulation flow path 44d.

Further, a fourth cooling heat exchanger 54d is arranged on the downstream side of the second battery 32b in the fourth circulation flow path 44d. When the fourth cooling medium whose temperature rises by cooling the first battery 32a and the second battery 32b passes through the fourth cooling heat exchanger 54d, the fourth cooling medium is, for example, cooled by cooling air from a cooling fan (not shown) provided in the vicinity of the fourth cooling heat exchanger 54d, or air in contact with the fourth cooling heat exchanger 54d. The cooled fourth cooling medium is temporarily stored in the fourth storage container 50d, and then sent out to the fourth circulation flow path 44d under the action of the fourth pump 52d. By repeating the above, the fourth cooling medium can circulate and flow in the fourth circulation flow path 44d.

As shown in FIG. 4, the third circulation flow path 44c and the fourth circulation flow path 44d do not communicate with each other. Accordingly, the third cooling medium and the fourth cooling medium do not merge or split. That is, the third cooling circuit 42c and the fourth cooling circuit 42d are also independent circuits (systems). Therefore, it is possible to set the fourth cooling circuit 42d to either the flow state or the flow stopped state while the third cooling circuit 42c is in the flow state.

The third pump 52c, the fourth pump 52d, the third temperature sensor 48c, and the fourth temperature sensor 48d are electrically connected to the CPU 56. That is, the CPU 56 receives the temperatures detected by the third temperature sensor 48c and the fourth temperature sensor 48d as information signals, and transmits a command signal of energization or stop to the third pump 52c and the fourth pump 52d. Further, the first generator 35a and the second generator 35b are also electrically connected to the CPU 56. Information regarding whether the first generator 35a and the second generator 35b are operating is sent to the CPU 56.

The first pump 52a, the second pump 52b, the third pump 52c, and the fourth pump 52d are all variable displacement pumps. That is, the CPU 56 can control the circulation flow rates (supply flow rates) of the first cooling medium, the second cooling medium, the third cooling medium, and the fourth cooling medium by appropriately adjusting the discharge pressures of the first pump 52a, the second pump 52b, the third pump 52c, and the fourth pump 52d. Suitable specific examples of the first cooling medium to the fourth cooling medium include water, oil, ethylene glycol, etc.

The multicopter 10 according to the present embodiment is basically equipped with the first cooling facility 40a and the second cooling facility 40b configured as described above. Next, the functions and effects thereof will be described in relation to the operations of the first cooling facility 40a and the second cooling facility 40b.

The multicopter 10 shown in FIG. 1 can take off and fly by energizing the motors 37a to 37f (see FIG. 2). That is, the rotation shafts of the motors 37a to 37f rotate, and the rotor blades of the propellers 20a to 20f rotate following the rotation shafts, which creates lift that raises or flies the multicopter 10. The multicopter 10 that has risen in the air flies horizontally in the air at a substantially constant predetermined speed. At this time, the multicopter 10 is in the steady operation state. Then, the multicopter 10 that has flown a predetermined distance lands by reducing the lift created by the propellers 20a to 20f.

In the above process from takeoff to landing, the loads carried by the first engine 30a, the second engine 30b, the first battery 32a, and the second battery 32b change. The load is large during takeoff, landing, and acceleration, and small during the steady operation. Then, when the loads on the first engine 30a and the second engine 30b are large, the first PCU 34a and the second PCU 34b have high temperatures; and when the loads on the first battery 32a and the second battery 32b are large, the first battery 32a and the second battery 32b have high temperatures.

Figure 5:
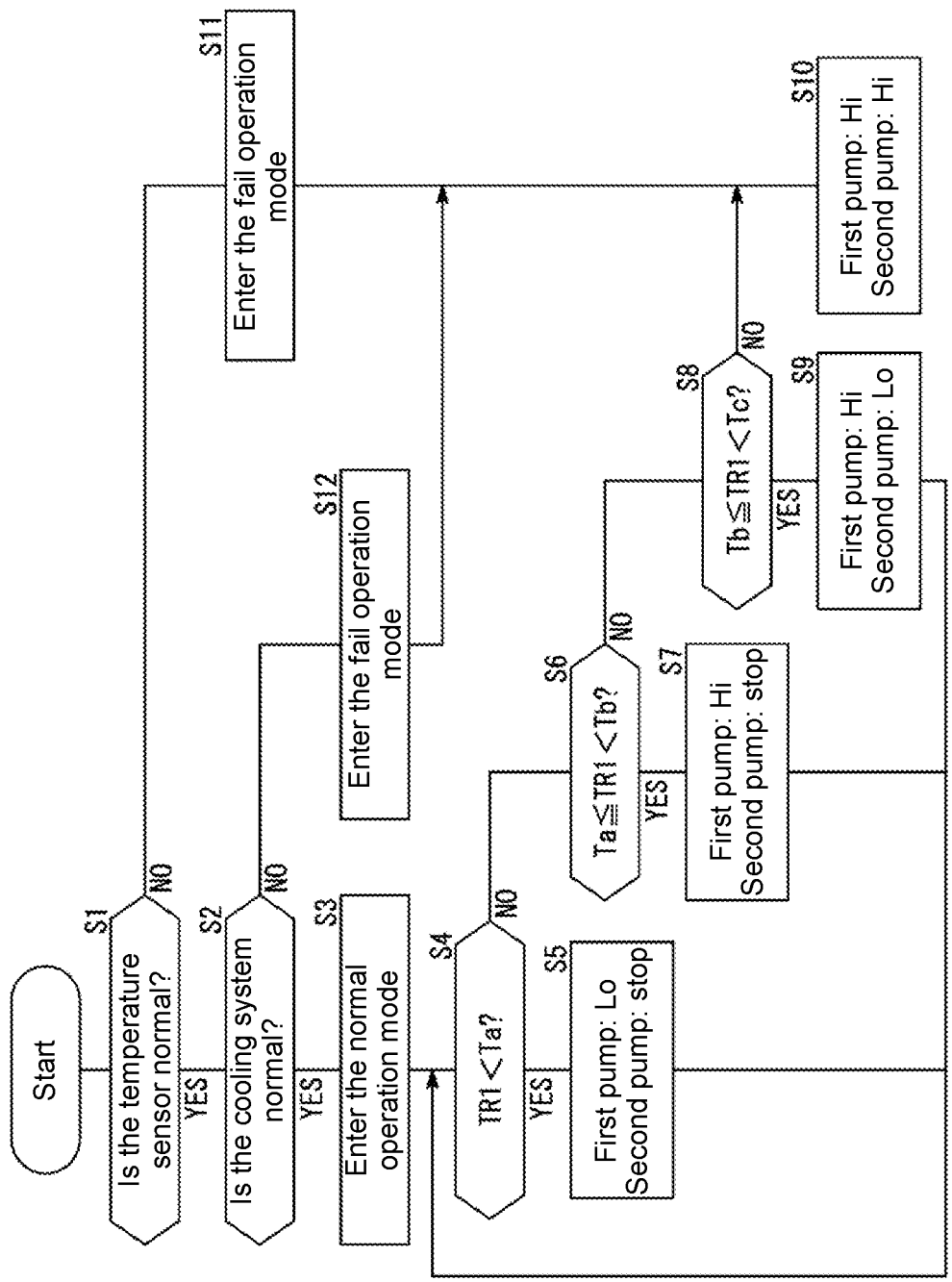
FIG. 5 is a schematic flowchart regarding an operation of the first cooling facility.

The operation of the first cooling circuit 42a when cooling the first PCU 34a and the second PCU 34b will be described. FIG. 5 is a schematic flowchart regarding the operation of the first cooling circuit 42a. "Lo" in FIG. 5 indicates that the first pump 52a and the second pump 52b are operated at low output. Further, "Hi" means that the first pump 52a and the second pump 52b are operated at high output.

A temperature threshold value for determining whether to energize the first pump 52a and the second pump 52b and what kind of discharge pressure is applied during energization is input to the CPU 56. In the present embodiment, regarding the temperature of the first cooling medium detected by the first temperature sensor 48a (hereinafter, also referred to as "detected temperature TR1"), Ta which is the temperature of a % of the maximum allowable temperature Tmax, Tb which is the temperature of b % of the maximum allowable temperature Tmax, and Tc which is the temperature of c % of the maximum allowable temperature Tmax are input as temperature threshold values. Of course, a, b, and c are positive, and satisfy the relationship of a<b<c. In addition, the maximum allowable temperature Tmax is a temperature at which the first PCU 34a and the second PCU 34b can be kept at or below the heat resistant temperature.

First, the first pump 52a is energized to operate at low output. In this state, in step S1, it is determined whether the information signal from the first temperature sensor 48a is received by the CPU 56, and whether the received value is normal. If "YES", the process proceeds to step S2, and it is determined whether some abnormality has occurred, such as whether the first cooling medium is flowing in the first circulation flow path 44a and whether the cooling fan is rotating. When it is determined as "normal (YES)", it enters a normal operation mode in step S3.

As described above, information regarding the detected temperature TR1 of the first cooling medium is transmitted to the CPU 56. In step S4, the CPU 56 determines whether the detected temperature TR1 is lower than Ta. If "YES", the process proceeds to step S5, and the first pump 52a operates at low output. On the other hand, the second pump 52b is stopped. Accordingly, at this time, only the first cooling medium flowing through the first cooling jacket 46a cools the first PCU 34a and the second PCU 34b. When step S5 is completed, the process returns to step S4.

When the load on the first engine 30a or the second engine 30b is large, the temperature of either the first PCU 34a or the second PCU 34b becomes high. In this case, it is determined as "NO" in step S4, and the process proceeds to step S6. In step S6, it is determined whether the detected temperature TR1 is lower than Tb. When the detected temperature TR1 is lower than Tb, it is determined as "YES."

At this time, the temperature of the first cooling medium is equal to or higher than Ta and lower than Tb, and is a relatively high temperature. Therefore, the CPU 56 transmits a command signal to the first pump 52a, and in step S7, operates the first pump 52a at high output. Along with this, the circulation supply amount of the first cooling medium increases. That is, the circulation amount of the first cooling medium in the first cooling jacket 46a is larger than that when the detected temperature TR1 is lower than Ta, which makes it possible to sufficiently cool the first PCU 34a and the second PCU 34b. When step S7 is completed, the process returns to step S4.

On the other hand, when it is determined as "NO" in step S6, that is, when the detected temperature TR1 is equal to or higher than Tb, the process proceeds to step S8 to determine whether the detected temperature TR1 is lower than Tc. When the detected temperature TR1 is lower than Tc, it is determined as "YES."

At this time, the temperature of the first cooling medium is equal to or higher than Tb and lower than Tc, and is a higher temperature. Therefore, the CPU 56 transmits a command signal to the first pump 52a and the second pump 52b, and in step S9, operates the first pump 52a at high output, and energizes the second pump 52b to operate at low output. Along with this, the circulation supply amount of the first cooling medium increases, and the second cooling medium starts to circulate in the second circulation flow path 44b. That is, in addition to that the circulation amount of the first cooling medium in the first cooling jacket 46a is larger than that when the detected temperature TR1 is lower than Tb, the second cooling medium flows in the second cooling jacket 46b.

When it is expected that it is not easy to remove the heat from the first PCU 34a and the second PCU 34b only by increasing the circulation amount of the first cooling medium, the second cooling circuit 42b operates and the circulation supply of the second cooling medium is started. Thus, cooling performed by the first cooling medium flowing through the first cooling jacket 46a and cooling performed by the second cooling medium flowing through the second cooling jacket 46b are performed at the same time. Therefore, in this case, the first PCU 34a and the second PCU 34b can still be sufficiently cooled. When step S9 is completed, the process returns to step S4.

When it is determined as "NO" in step S8, that is, when the detected temperature TR1 is equal to or higher than Tc, the process proceeds to step S10. In this step S10, the CPU 56 transmits a command signal to the second pump 52b, and operates the second pump 52b at high output. That is, in this case, both the first pump 52a and the second pump 52b operate at high output. Therefore, the circulation supply amounts of both the first cooling medium and the second cooling medium increase.

When it is expected that it is not easy to remove the heat from the first PCU 34a and the second PCU 34b even with the circulation amount of the first cooling medium increased and the supply of the second cooling medium started, the supply amount of the second cooling medium is increased. That is, a large amount of the first cooling medium and the second cooling medium flow to the first cooling jacket 46a and the second cooling jacket 46b. Therefore, in this case, the first PCU 34a and the second PCU 34b can still be sufficiently cooled. When step S10 is completed, the process returns to step S4.

Here, when it is determined as "NO" in steps S1 and S2, the CPU 56 determines "enter the fail operation mode" in steps S11 and S12. That is, the process proceeds to step S10, a command signal is transmitted to the first pump 52a and the second pump 52b, and both the first pump 52a and the second pump 52b are operated at high output. Thus, the circulation supply amounts of both the first cooling medium and the second cooling medium increase. In this way, a so-called fail-safe is incorporated in the operation control of the first cooling circuit 42a. Therefore, even if an unexpected situation occurs, the first PCU 34a and the second PCU 34b can be sufficiently cooled.

The above control regarding the first pump 52a and the second pump 52b is an example, and the timing of starting the energization of the second pump 52b (starting the supply of the second cooling medium) and the output of the first pump 52a and the second pump 52b may be appropriately set according to whether the multicopter 10 is small or large. FIG. 6 shows the above operation pattern as the first example, and other operation patterns corresponding to the detected temperature TR1 as the second example and the third example. The definitions of "Lo" and "Hi" in FIG. 6 are the same as in FIG. 5. Further, the temperature of the second cooling medium may be monitored together with the temperature of the first cooling medium by the second temperature sensor 48b.

Figure 7:
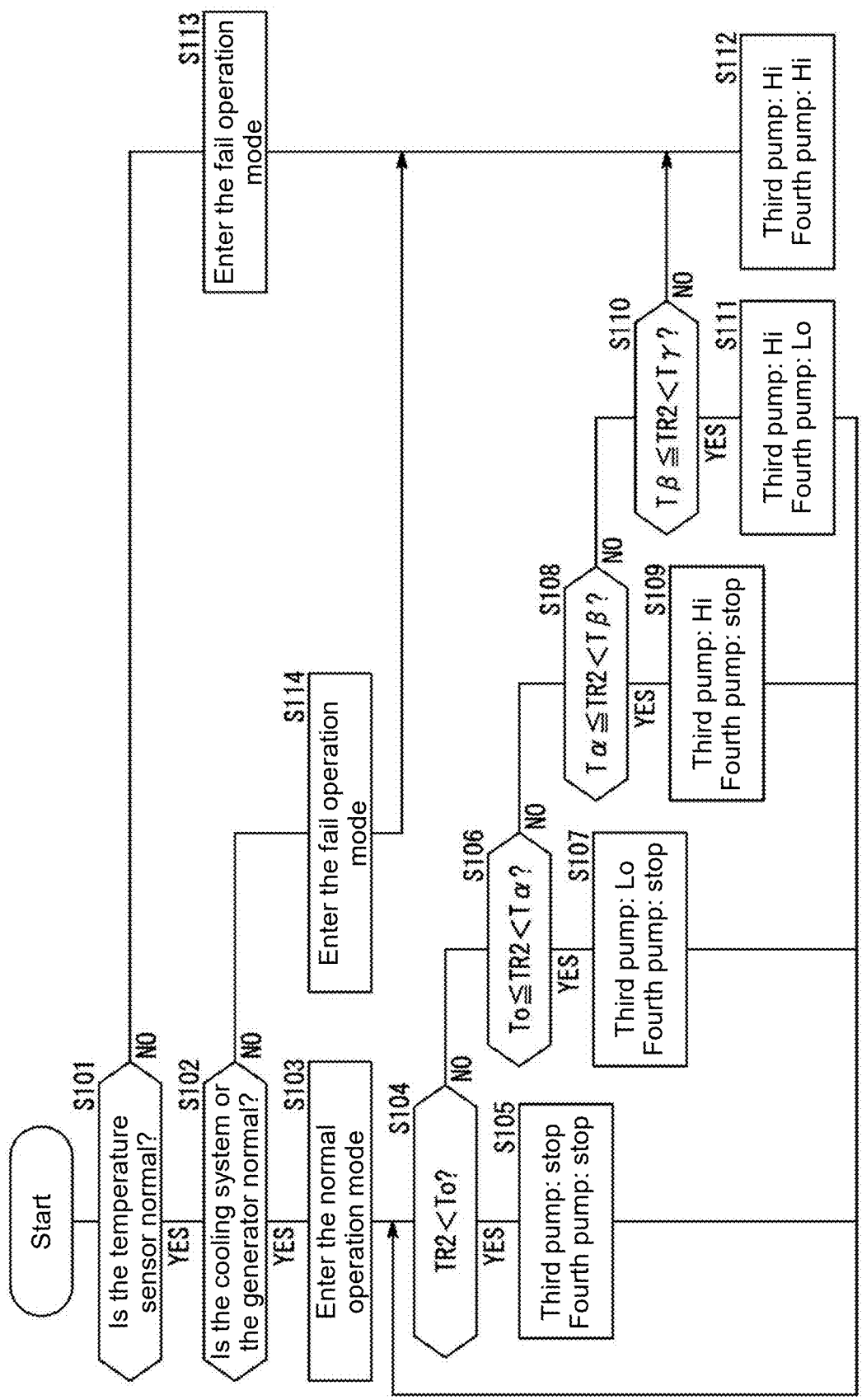
FIG. 7 is a schematic flowchart regarding an operation of the second cooling facility.

Next, the operation of the second cooling circuit 42b for cooling the first battery 32a and the second battery 32b will be described. FIG. 7 is a schematic flowchart regarding the operation of the second cooling circuit 42b. In addition, "Lo" and "Hi" in FIG. 7 and FIG. 8 mean that the first pump 52a and the second pump 52b are operated at low output and high output, respectively.

A temperature threshold value for determining whether to energize the third pump 52c and the fourth pump 52d and what kind of discharge pressure is applied during energization is also input to the CPU 56. In the present embodiment, regarding the temperatures of the first battery 32a and the second battery 32b detected by the third temperature sensor 48c and the fourth temperature sensor 48d (hereinafter, also referred to as "detected temperatures TR2"), To which is the optimum temperature for operating the first battery 32a and the second battery 32b, T$\alpha$ which is $\alpha$ degree higher than To, T$\beta$ which is $\beta$ degree higher than To, and T$\gamma$ which is $\gamma$ degree higher than To are input as temperature threshold values. Of course, $\alpha$, $\beta$, and $\gamma$ are positive, and have a relationship of $\alpha<\beta<\gamma$. The temperatures of the third cooling medium and the fourth cooling medium may be detected by the third temperature sensor 48c and the fourth temperature sensor 48d, and these may be used as the temperatures of the first battery 32c and the second battery 32d.

First, the third pump 52c is energized to operate at low output. In this state, in step S101, it is determined whether the information signals from the third temperature sensor 48c and the fourth temperature sensor 48d are received by the CPU 56, and whether the received value is normal. If "YES", the process proceeds to step S102, and it is determined whether some abnormality has occurred, such as whether the third cooling medium is flowing in the third circulation flow path 44c, whether the generators 35a, 35b, 35c or 35d is operating, and whether the cooling fan is rotating. When it is determined as "normal (YES)", it enters a normal operation mode in step S103.

As described above, information regarding the detected temperature TR2 of the third cooling medium detected by the third temperature sensor 48c and the fourth temperature sensor 48d is transmitted to the CPU 56. In step S104, the CPU 56 determines whether the detected temperature TR2 is lower than To. If "YES", the process proceeds to step S105, and the third pump 52c is stopped. On the other hand, the fourth pump 52d is maintained in a stopped state. That is, in this case, the third cooling medium stays in the third cooling jacket 46c, and the fourth cooling medium stays in the fourth cooling jacket 46d. Therefore, the heat of the first battery 32a and the second battery 32b is suppressed from being removed by the third cooling medium or the fourth cooling medium. That is, the first battery 32a and the second battery 32b are prevented from being excessively cooled. Then, when step S105 is completed, the process returns to step S104.

The situation where the detected temperature TR2 is lower than To is typically when the multicopter 10 is in a steady operation. At this time, the first battery 32a, the second battery 32b, or both are charged by the first generator 35a via the first junction box 36a and the second junction box 36b. Similarly, the first battery 32a, the second battery 32b, or both are charged by the second generator 35b via the first junction box 36a and the second junction box 36b.

At the time of takeoff, landing, acceleration, etc., the load on the first battery 32a and the second battery 32b is large, and the temperatures of the first battery 32a and the second battery 32b rises to be equal to or higher than To. In this case, it is determined as "NO" in step S104, and the process proceeds to step S106. In step S106, it is determined whether the detected temperature TR2 is lower than T$\alpha$. When the detected temperature TR2 is lower than T$\alpha$, it is determined as "YES."

At this time, the temperature of the first battery 32a is equal to or higher than To and lower than T$\alpha$, and is a relatively high temperature. Therefore, the CPU 56 transmits a command signal to the third pump 52c, and in step S107, energizes the third pump 52c to operate at low output. Along with this, the circulation supply of the third cooling medium is started. That is, the third cooling medium starts to flow in the third cooling jacket 46c. Therefore, the heat of the first battery 32a and the second battery 32b is removed by the third cooling medium. That is, the first battery 32a and the second battery 32b are cooled.

At this point, the fourth pump 52d remains stopped. Therefore, the fourth cooling medium does not flow through the fourth circulation flow path 44d. That is, only the third cooling medium cools the first battery 32a and the second battery 32b. Further, since the third pump 52c operates at low output, the circulation amount of the third cooling medium is small. Therefore, the first battery 32a and the second battery 32b are prevented from being excessively cooled to set the detected temperature TR2 lower than To. When step S107 is completed, the process returns to step S104.

It is assumed that the load on the first battery 32a and the second battery 32b further increases, and the temperatures of the first battery 32a and the second battery 32b increase to be equal to or higher than T$\alpha$. In this case, it is determined as "NO" in steps S104 and S106, and the process proceeds to step S108. In step S108, it is determined whether the detected temperature TR2 is lower than T$\beta$. When the detected temperature TR2 is lower than T$\beta$, it is determined as "YES."

At this time, the temperature of the first battery 32a is equal to or higher than T$\alpha$ and lower than T$\beta$, and is a higher temperature. Therefore, the CPU 56 transmits a command signal to the third pump 52c, and in step S109, operates the third pump 52c at high output. Along with this, the supply amount of the third cooling medium increases. That is, a larger amount of the third cooling medium flows in the third cooling jacket 46c. Therefore, in this case, the heat of the first battery 32a and the second battery 32b is still sufficiently removed by the third cooling medium. That is, the first battery 32a and the second battery 32b are sufficiently cooled.

Even at this point, the fourth pump 52d is still stopped. Therefore, the fourth cooling medium does not flow through the fourth circulation flow path 44d. That is, only the third cooling medium cools the first battery 32a and the second battery 32b. When step S109 is completed, the process returns to step S104.

It is assumed that the load on the first battery 32a and the second battery 32b further increases, and the temperatures of the first battery 32a and the second battery 32b increase to be equal to or higher than Tβ. In this case, it is determined as "NO" in steps S104, S106, and S108, and the process proceeds to step S110. In step S110, it is determined whether the detected temperature TR2 is lower than Tγ. When the detected temperature TR2 is lower than Tγ, it is determined as "YES."

At this time, the temperature of the first battery 32a is equal to or higher than Tβ and lower than Tγ, and is a higher temperature. Therefore, the CPU 56 transmits a command signal to the fourth pump 52d, and in step S111, energizes the fourth pump 52d to operate at low output. Along with this, flow of the fourth cooling medium in the fourth cooling jacket 46d is started. That is, a large amount of the third cooling medium flows in the third cooling jacket 46c, while a relatively small amount of the fourth cooling medium flows in the fourth cooling jacket 46d.

When it is expected that it is not easy to remove the heat from the first battery 32a and the second battery 32b only by increasing the circulation amount of the third cooling medium, the fourth cooling circuit 42d operates and the circulation supply of the fourth cooling medium is started. Thus, cooling performed by the third cooling medium flowing through the third cooling jacket 46c and cooling performed by the fourth cooling medium flowing through the fourth cooling jacket 46d are performed at the same time. Therefore, in this case, the heat of the first battery 32a and the second battery 32b is sufficiently removed by the third cooling medium and the fourth cooling medium. That is, the first battery 32a and the second battery 32b can be sufficiently cooled. When step S111 is completed, the process returns to step S104.

On the other hand, when it is determined as "NO" in steps S104, S106, S108, and S110, that is, when the detected temperature TR2 is equal to or higher than Tγ, the process proceeds to step S112. At this time, the temperature of the first cooling medium is equal to or higher than Tγ, and is an even higher temperature. Therefore, the CPU 56 transmits a command signal to the fourth pump 52d, and in step S112, operates both the first pump 52a and the second pump 52b at high output. Along with this, the circulation supply amount of the fourth cooling medium is further increased. That is, in addition to that the circulation amount of the third cooling medium in the third cooling jacket 46c is larger than that when the detected temperature TR2 is lower than Tβ, the circulation amount of the fourth cooling medium in the fourth cooling jacket 46d becomes larger than that when the detected temperature TR2 is lower than Tγ.

When it is expected that it is not easy to remove the heat from the first battery 32a and the second battery 32b even with the circulation amount of the third cooling medium increased and the supply of the third cooling medium started, the supply amount of the fourth cooling medium is increased. That is, a large amount of the third cooling medium and the fourth cooling medium flow to the third cooling jacket 46c and the fourth cooling jacket 46d. Therefore, in this case, the first battery 32a and the second battery 32b can still be sufficiently cooled. When step S112 is completed, the process returns to step S104.

When it is determined as "NO" in steps S101 and S102, the CPU 56 determines "enter the fail operation mode" in steps S113 and S114. That is, the process proceeds to step S112, a command signal is transmitted to the third pump 52c and the fourth pump 52d, and both the third pump 52c and the fourth pump 52d are operated at high output. Thus, both the third cooling medium and the fourth cooling medium are supplied in a large amount and circulate. In this way, the fail-safe is also incorporated in the operation control of the second cooling circuit 42b. Therefore, even if an unexpected situation occurs, the first battery 32a and the second battery 32b can be sufficiently cooled.

The above control regarding the third pump 52c and the fourth pump 52d is an example, and similar to the control regarding the first pump 52a and the second pump 52b, the timing of starting the energization of the fourth pump 52d (starting the supply of the second cooling medium) and the output of the third pump 52c and the fourth pump 52d may be appropriately set according to whether the multicopter 10 is small or large. FIG. 8 shows the above operation pattern as the first example, and other operation patterns corresponding to the detected temperature TR2 as the second example and the third example.

It can be seen from FIG. 6 and FIG. 8 that it is possible to control with various operation patterns by adopting variable displacement pumps as the first pump 52a, the second pump 52b, the third pump 52c, and the fourth pump 52d. Although FIG. 6 and FIG. 8 show switching between low output operation and high output operation only in order to simplify the description and facilitate understanding, it is also possible to set an intermediate output operation between low output operation and high output operation. The low output operation, the intermediate output operation, and the high output operation may be set to, for example, 40% to 60%, 60% to 80%, and 80% to 100% of the maximum output, respectively.

Further, although not particularly shown in FIG. 5 and FIG. 7, even if the first engine 30a or the second engine 30b, or the first generator 35a or the second generator 35b stops due to an unexpected situation while the rotor blades of the propellers 20a to 20f are rotating, the first pump 52a, the second pump 52b, the third pump 52c, and the fourth pump 52d may operate at high output.

Figure 9:
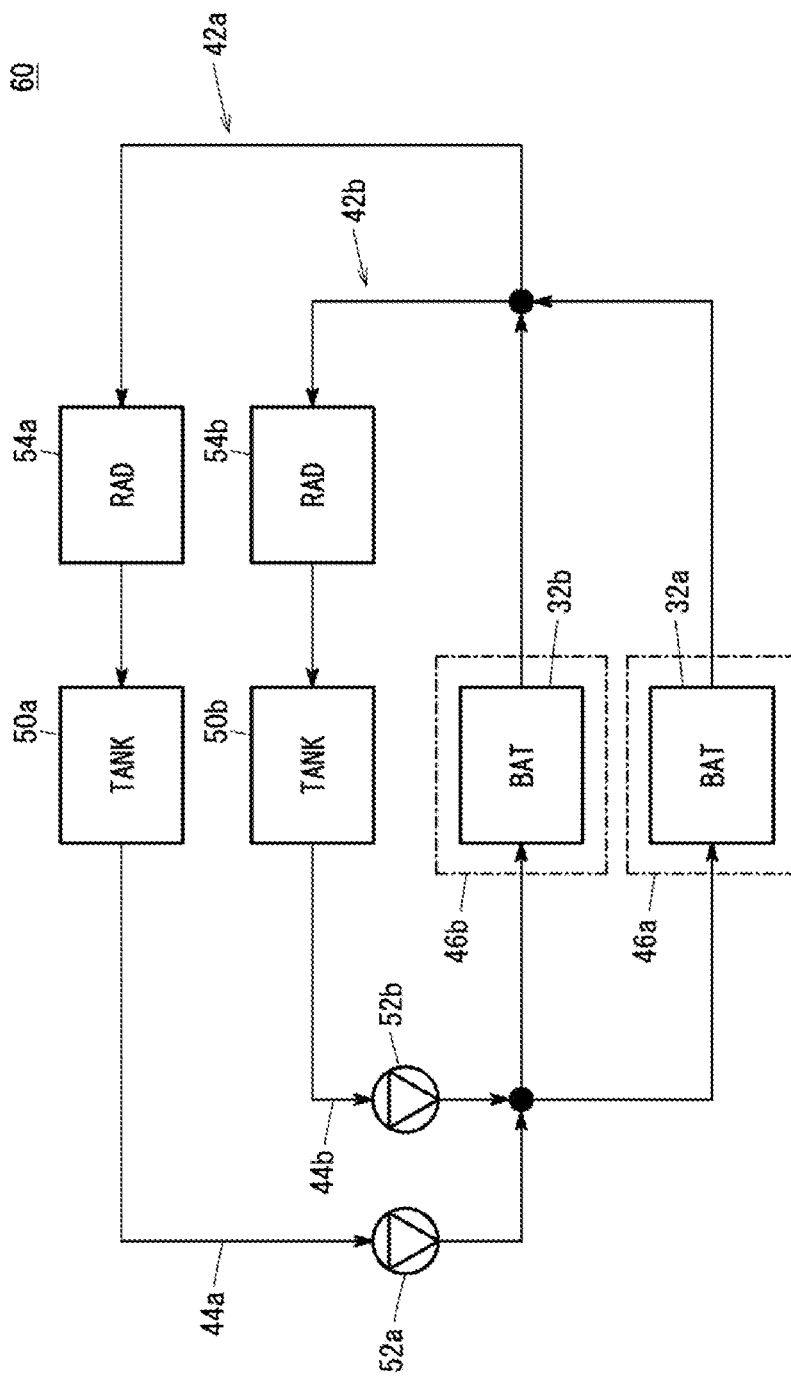
FIG. 9 is a schematic cooling system diagram of a distributed integrated type cooling facility.
Figure 10:
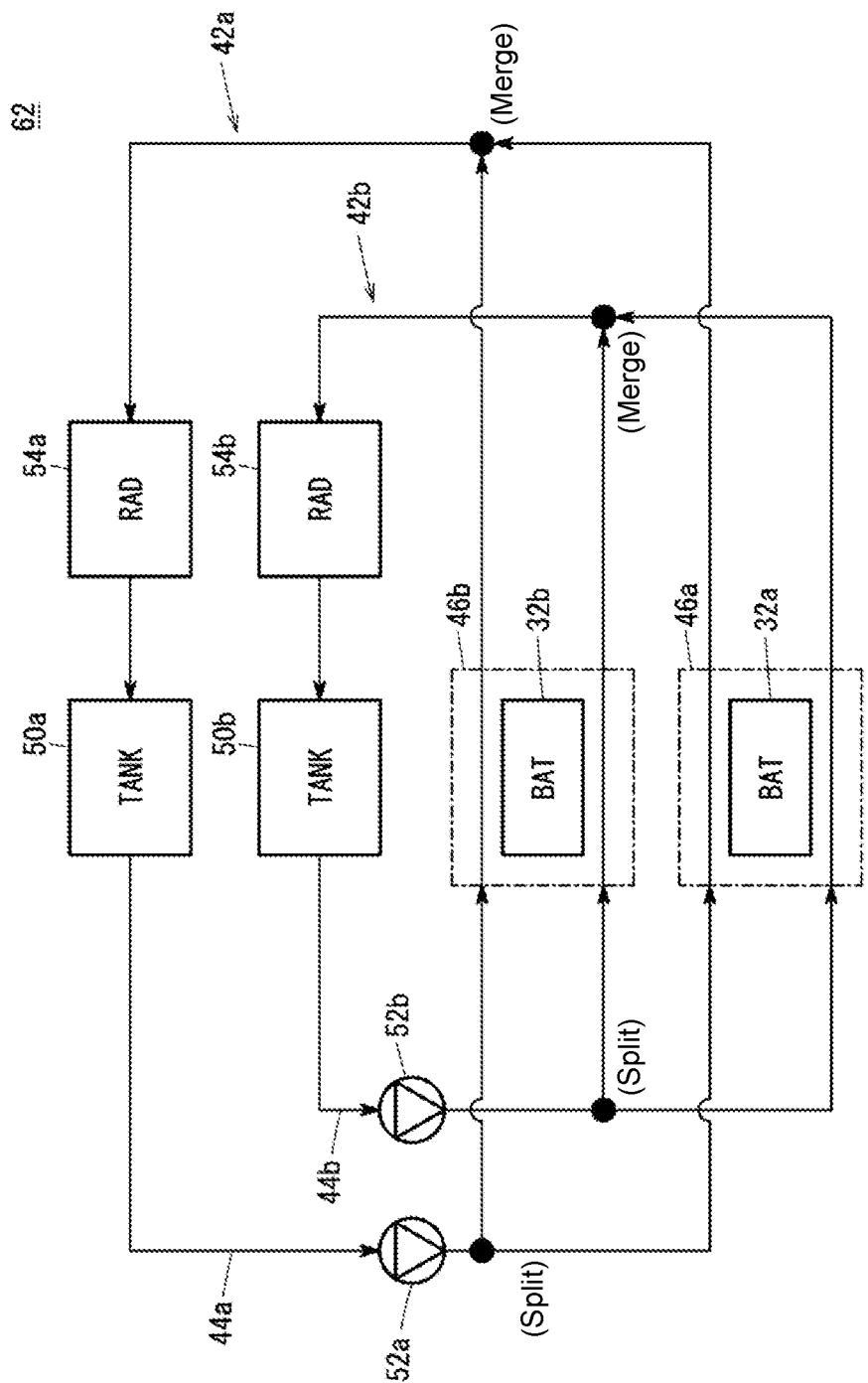
FIG. 10 is a schematic cooling system diagram of a parallel type cooling facility.

Here, for comparison, FIG. 9 and FIG. 10 show a distributed integrated type cooling facility 60 and a parallel type cooling facility 62, respectively. The components shown in FIG. 2 to FIG. 4 are assigned with the same reference numerals.

In the case of the distributed integrated type cooling facility 60 shown in FIG. 9, the second circulation flow path 44b branches from a predetermined point of the first circulation flow path 44a, and the second circulation flow path 44b joins the first circulation flow path 44a at another predetermined point. That is, in this case, the first circulation flow path 44a and the second circulation flow path 44b communicate with each other at two points. In this configuration, if a problem occurs in the communication point, the cooling medium cannot flow to both the first circulation flow path 44a and the second circulation flow path 44b. That is, it becomes difficult to cool the first battery 32a and the second battery 32b.

Further, in the parallel type cooling facility 62 shown in FIG. 10, both the first circulation flow path 44a and the second circulation flow path 44b need to be provided with branch flow paths that individually pass through the first battery 32a and the second battery 32b. As the number of pipes increases and the structure becomes complicated correspondingly, it becomes difficult to reduce the size.

In contrast thereto, in the first cooling facility 40a (second cooling facility 40b) according to the present embodiment, the first circulation flow path 44a and the second circulation flow path 44b (third circulation flow path 44c and fourth circulation flow path 44d) do not communicate with each other. Therefore, when it becomes difficult to circulate and flow the first cooling medium (third cooling medium) in the first circulation flow path 44a (third circulation flow path 44c), the first PCU 34a and the second PCU 34b (first battery 32a and second battery 32b) can be cooled by the second cooling medium (fourth cooling medium) flowing through the second circulation flow path 44b (fourth circulation flow path 44d). Further, since it is not necessary to provide branch flow paths in the first circulation flow path 44a and the second circulation flow path 44b (third circulation flow path 44c and fourth circulation flow path 44d), the number of pipes does not increase excessively. Correspondingly, the cooling facility can be downsized.

The disclosure is not particularly limited to the above-described embodiments, and various modifications can be made without departing from the gist of the disclosure.

For example, in this embodiment, the temperature of the first cooling medium immediately before flowing into the cooling jacket provided in the vicinity of the first PCU 34a and the second PCU 34b is detected, but the temperature of the first PCU 34a itself and the temperature of the second PCU 34b itself may be detected.

Further, in this embodiment, the second pump 52b and the fourth pump 52d are energized or stopped, but an on-off valve controlled by the CPU 56 may be provided in each of the second circulation flow path 44b and the fourth circulation flow path 44d, and the second pump 52b and the fourth pump 52d may be continuously energized. In this case, when the flow of the second cooling medium and the fourth cooling medium is started, the on-off valve may be opened with a small opening. Further, when the circulation amount is increased, the opening of the on-off valve may be increased. Similarly, in each of the first circulation flow path 44a and the third circulation flow path 44c, an on-off valve controlled by the CPU 56 may be provided so that the first pump 52a and the third pump 52c are continuously energized.

Figure 11:
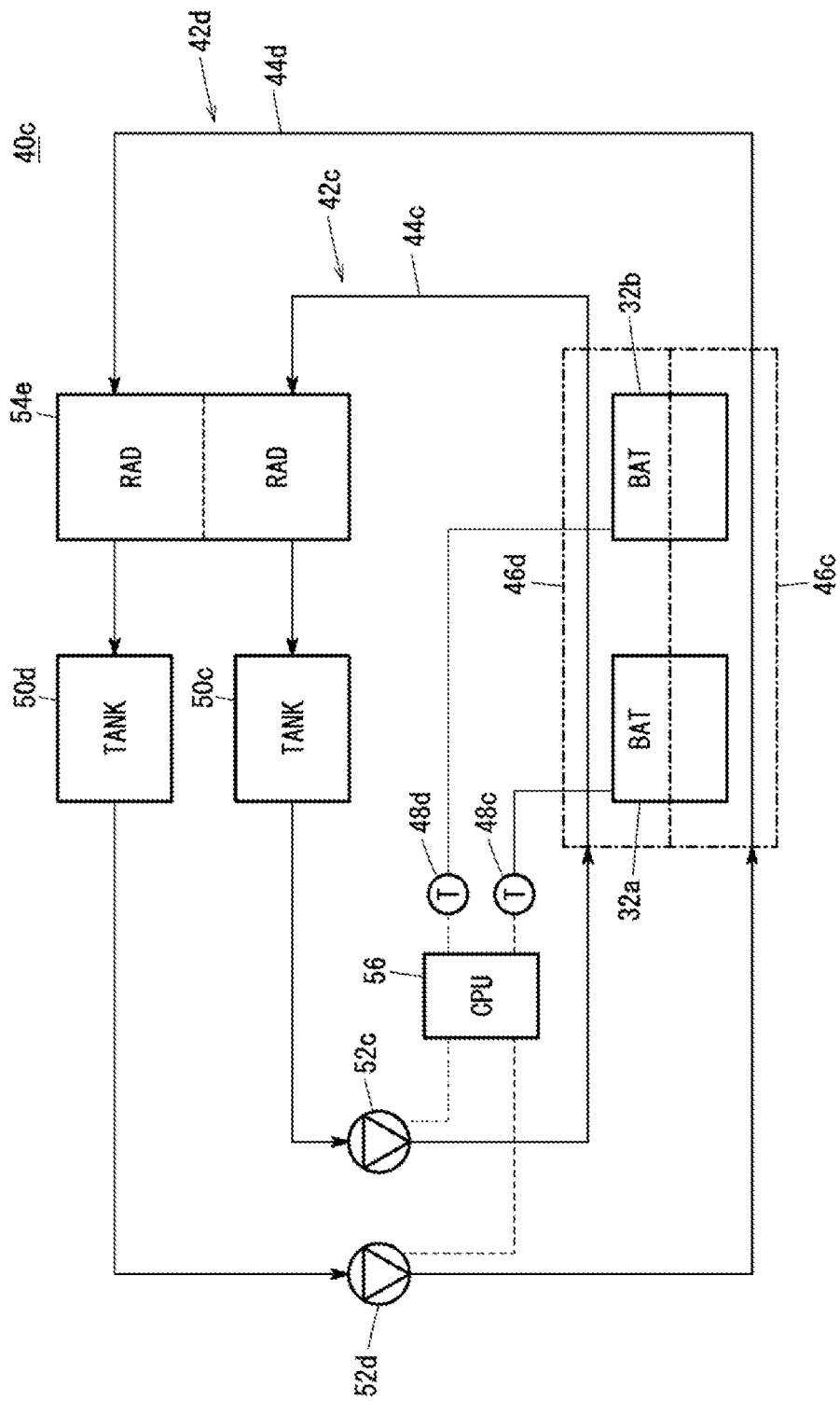
FIG. 11 is a second cooling system diagram schematically showing a second cooling facility according to a modified example.

In addition, as in the third cooling facility 40c exemplified in FIG. 11, the first cooling medium and the second cooling medium may flow in one cooling heat exchanger 54e. In this case, the flow path through which the first cooling medium flows and the flow path through which the second cooling medium flows may be separately provided in the cooling heat exchanger 54e. Of course, the first cooling facility 40a can be changed in the same manner.

In any case, the cooling target is not particularly limited to the first PCU 34a, the second PCU 34b, the first battery 32a, and the second battery 32b. For example, the cooling target may be the CPU 56, the first generator 35a, the second generator 35b, a DC-DC converter, etc. Furthermore, the number of cooling targets may be 3 or more.

What is claimed is:

1. An aircraft, comprising a cooling facility for cooling a cooling target, wherein
    the cooling facility has a first cooling circuit and a second cooling circuit that are independent of each other,
    the first cooling circuit comprises a first circulation flow path that allows a first cooling medium to sequentially and repeatedly pass through the cooling target, a first pressure applying part provided in the first circulation flow path to apply a first extrusion pressure to the first cooling medium, and a first cooling heat exchanger provided on a downstream side of the first circulation flow path with respect to the cooling target to take heat from the first cooling medium,
    the second cooling circuit comprises a second circulation flow path that allows a second cooling medium to sequentially and repeatedly pass through the cooling target, a second pressure applying part provided in the second circulation flow path to apply a second extrusion pressure to the second cooling medium, and a second cooling heat exchanger provided on a downstream side of the second circulation flow path with respect to the cooling target to take heat from the second cooling medium,
    the first circulation flow path and the second circulation flow path do not communicate with each other,
    the first circulation flow path is connected to the cooling target to which the second cooling medium passes through,
    the second circulation flow path is connected to the cooling target to which the first cooling medium passes through, and
    the cooling target comprises a plurality of cooling targets arranged in series in a flow direction of the first cooling medium and the second cooling medium.

2. The aircraft according to claim 1, further comprising a determination part determining whether to circulate or stop circulating the first cooling medium or the second cooling medium, wherein
    the determination part determines whether to cool the cooling target only by the first cooling circuit or cool the cooling target by both the first cooling circuit and the second cooling circuit according to an amount of heat of the cooling target.

3. The aircraft according to claim 2, wherein the determination part determines to stop circulating the second cooling medium when a temperature of the first cooling medium or the cooling target is equal to or lower than a preset predetermined value while the cooling target is cooled only by the first cooling circuit, and determines to circulate the second cooling medium when the temperature of the first cooling medium or the cooling target exceeds the predetermined value.

4. The aircraft according to claim 3, wherein the determination part determines not to supply both the first cooling medium and the second cooling medium when the temperature of the cooling target falls below the preset predetermined value.

5. The aircraft according to claim 4, wherein the cooling target is a power control unit.

6. The aircraft according to claim 4, wherein the cooling target is a battery.

7. The aircraft according to claim 4, wherein the first pressure applying part and the second pressure applying part are variable displacement pumps capable of adjusting supply amounts of the first cooling medium and the second cooling medium.

8. The aircraft according to claim 3, wherein the cooling target is a power control unit.

9. The aircraft according to claim 3, wherein the cooling target is a battery.

10. The aircraft according to claim 9, comprising a rotary electric machine that supplies electric power to the battery while the aircraft is in operation, wherein the determination part determines to circulate both the first cooling medium and the second cooling medium when the rotary electric machine stops during the operation of the aircraft.

11. The aircraft according to claim 10, wherein the determination part is electrically connected to the rotary electric machine, and the determination part obtains information regarding whether the rotary electric machine is in operation.

12. The aircraft according to claim 3, wherein the first pressure applying part and the second pressure applying part are variable displacement pumps capable of adjusting supply amounts of the first cooling medium and the second cooling medium.

13. The aircraft according to claim 2, wherein the cooling target is a power control unit.

14. The aircraft according to claim 2, wherein the cooling target is a battery.

15. The aircraft according to claim 14, comprising a rotary electric machine that supplies electric power to the battery while the aircraft is in operation, wherein the determination part determines to circulate both the first cooling medium and the second cooling medium when the rotary electric machine stops during the operation of the aircraft.

16. The aircraft according to claim 15, wherein the determination part is electrically connected to the rotary electric machine, and the determination part obtains information regarding whether the rotary electric machine is in operation.

17. The aircraft according to claim 2, wherein the first pressure applying part and the second pressure applying part are variable displacement pumps capable of adjusting supply amounts of the first cooling medium and the second cooling medium.

18. The aircraft according to claim 1, wherein the cooling target is a power control unit.

19. The aircraft according to claim 18, wherein the first pressure applying part and the second pressure applying part are variable displacement pumps capable of adjusting supply amounts of the first cooling medium and the second cooling medium.

20. The aircraft according to claim 1, wherein the cooling target is a battery.

21. The aircraft according to claim 20, wherein the first pressure applying part and the second pressure applying part are variable displacement pumps capable of adjusting supply amounts of the first cooling medium and the second cooling medium.

22. The aircraft according to claim 1, wherein the first pressure applying part and the second pressure applying part are variable displacement pumps capable of adjusting supply amounts of the first cooling medium and the second cooling medium.

23. The aircraft according to claim 1, wherein each of the first circulation flow path and the second circulation flow path is a single circulation flow path having no branching point.

24. The aircraft according to claim 1, wherein the cooling facility has no branch flow path, and each of the first circulation flow path and the second circulation flow path is a single circulation flow path.

25. An aircraft, comprising a cooling facility for cooling a cooling target, wherein the cooling facility has a first cooling circuit and a second cooling circuit that are independent of each other, the first cooling circuit comprises a first circulation flow path that allows a first cooling medium to sequentially and repeatedly pass through the cooling target, a first pressure applying part provided in the first circulation flow path to apply a first extrusion pressure to the first cooling medium, and a first cooling heat exchanger provided on a downstream side of the first circulation flow path with respect to the cooling target to take heat from the first cooling medium, the second cooling circuit comprises a second circulation flow path that allows a second cooling medium to sequentially and repeatedly pass through the cooling target, a second pressure applying part provided in the second circulation flow path to apply a second extrusion pressure to the second cooling medium, and a second cooling heat exchanger provided on a downstream side of the second circulation flow path with respect to the cooling target to take heat from the second cooling medium, the first circulation flow path and the second circulation flow path do not communicate with each other, the first cooling circuit and the second cooling circuit are configured to cool the same cooling target, and the cooling target comprises a plurality of cooling targets arranged in series in a flow direction of the first cooling medium and the second cooling medium.

* * * * *